United States Patent
Liu et al.

(12) 
(10) Patent No.: US 6,581,021 B2
(45) Date of Patent: Jun. 17, 2003

(54) METHOD FOR DOWNLOADING AND MANAGING TEST TOOL OF TEST SYSTEM

(75) Inventors: Yi Bo Liu, Tien Chin Chity (CN); Tong S. Chen, Taipei (TW); Kuang Shin Lin, Taipei (TW)

(73) Assignee: Inventec Corporation, Taipei (TW)

( * ) Notice: Subject to any disclaimer, the term of this patent is extended or adjusted under 35 U.S.C. 154(b) by 39 days.

(21) Appl. No.: 09/882,528

(22) Filed: Jun. 15, 2001

(65) Prior Publication Data

US 2001/0053961 A1 Dec. 20, 2001

(30) Foreign Application Priority Data

Jun. 17, 2000 (TW) .................................. 89111914 A

(51) Int. Cl.[7] .............................................. G01M 19/00
(52) U.S. Cl. ........................................ 702/123; 702/121
(58) Field of Search .................................. 702/123, 121

(56) References Cited

U.S. PATENT DOCUMENTS

| | | | | | |
|---|---|---|---|---|---|
| 5,712,972 A | * | 1/1998 | Kakkar | ........................ | 714/26 |
| 5,909,544 A | * | 6/1999 | Anderson et al. | ........... | 709/208 |
| 6,032,275 A | * | 2/2000 | Tsuto | .......................... | 714/720 |

* cited by examiner

*Primary Examiner*—John Barlow
*Assistant Examiner*—M. Walling
(74) *Attorney, Agent, or Firm*—Sawyer Law Group LLP

(57) ABSTRACT

A method for downloading and managing a test tool of a test system is proposed, which is applied to the test system having a test service server and a tested machine. A test tool required for performing a test for the tested machine is available as being downloaded from the test service server through a network, which connects the tested machine and the test service server, so as to examine if the tested machine works properly. As such, the test service server acts as a reservoir for the test tools and is used to activate start-up for the test, allowing the tested machine to be initiated with test conditions and user conditions for using the test tool being inputted to the test tool.

9 Claims, 4 Drawing Sheets

METHOD FOR DOWNLOADING AND MANAGING TEST TOOL OF TEST SYSTEM

FIELD OF THE INVENTION

The present invention relates to methods for downloading and managing test tools of test systems, and more particularly, to a method for downloading and managing a test tool of a test system having a test service server and a tested machine.

BACKGROUND OF THE INVENTION

In a conventional test system, a tested machine needs to be installed and loaded with a test tool prior to a test being applied thereto. Although the efficiency of using the test tool on performing the test for the tested machine is satisfactory, the prior preparation is rather time-consuming, that is, it is quite complex for loading the tested machine with the test tool, and proper adjustment and upgrading for the test tool are required in accordance with the increase in types of the tested machine and the change of the test environment, allowing the test for the tested machine to be performed with the optimal test tool.

Additionally, in application of the foregoing conventional method for managing the test tool of test system, the installation and loading of the test tool on each tested machine are performed by a user in person, rather than by mean of a network. Moreover, for the quicker loading of the test tool, a plurality of disks or CDs of the test tools are required, and thus problems in the preparation and distribution of the disks or CDs are generated. For example, for the tested machines distributed over various areas or countries, the use of the disks or CDs of the test tools is rather inconvenient. Therefore, the conventional method is inhered with drawbacks described as follows.

The tested machine is installed and loaded with the test tool prior to the test being applied thereto, wherein the loading process is rather complicated and needs the disks or CDs of the test tools which generate problems in preparation and distribution thereof.

The preparation of the disks or CDs of the test tools is time-consuming and costly if newly-edited or upgraded test tools are needed for the tested machines.

The current version of the test tools is hardly maintained.

As concluded from the above-mentioned, it is necessary to seek a method for downloading and managing a test tool of a test system, which allows a user to download a test tool from a test service server through a network, rather than to install the test tool in person or prepare disks or CDs of the test tools used for a tested machine. Moreover, if any adjustment or alteration for the tested machine is required during a test, the newly-edited or upgraded test tool is downloaded from the test service server. In addition, according to the increase in types of the tested machines and the change of the test environment, various test tools are available if necessary from the test service server so as to perform the test for the test machine with the optimal test tool.

In order to solve the foregoing drawbacks present in the conventional method for managing the test tool for the test system, a novel method for downloading and managing a test tool of a test system is proposed, which is applied to the test system having a test service server and a test machine. The test service server is connected with the tested machine through a network, allowing the tested machine to download the test tool from the test service server through the network and to be performed with the test in use of the downloaded test tool; that is, the test tool downloaded from the test service server is used to examine if the tested machine works properly. The test service server executes the managing process for the test tools, which includes the instructions of the test tools, explanation of the test process, layout of the tools and maintenance of versions. Moreover, the test service server provides the test tools through the network, so as to activate the start-up for a test for the tested machine. The start-up process is used to initiate the tested machine and to connect the tested machine and the test service server through the network, allowing the test tools to be downloaded from the test service server through the network. Then, the test for the tested machine can be performed with test conditions and user conditions for using the test tools being inputted to the test tools.

SUMMARY OF THE INVENTION

The primary objective of the present invention is to provide a method for downloading and managing a test tool of a test system having a test service server and a tested machine. The test service server is connected with the tested machines through a network, allowing a user to download the test tool from the test service server for using in the tested machine, so that the user does not need to install and loading the test tools in person or prepare disks or CDs of the test tools required for the tested machine. Moreover, the newly-edited or upgraded test tool can be downloaded from the test service server through the network in accordance with the adjustment or alteration for the tested machine. In addition, with the increase in types of the tested machines and the change of the test environment, various test tools are available if necessary from the test service server, so as to perform a test for the tested machine with the optimal test tool.

According to the above objectives, a method for downloading and managing a test tool of a test system is proposed in the present invention, which is applied to the test system having a test service server and a tested machine. The test service server is connected with the tested machine through a network, allowing a test tool in the test service server to be downloaded, installed and loaded through the network on the tested machine. The tested machine and the test service server can be located in different local area networks (LAN), wherein data transmission therebetween is accomplished by using internet and a browser, and the data obtained is displayed in the browser of the tested machine.

In the process for downloading and managing the test tool of the test system, the tested machine downloads the test tool from the test service server through the network which connects the tested machine and the test service server, wherein the downloaded test tool is used to examine if the tested machine works properly. The test service server executes the managing process for the test tools, which includes the instructions of the test tools, explanation of the test process, layout of the tools and maintenance of versions. Moreover, the test service server provides the test tools through the network, so as to activate the start-up for a test for the tested machine. The start-up process is used to initiate the tested machine and to connect the tested machine and the test service server through the network, allowing the test tools to be downloaded from the test service server through the network. Then, the test for the tested machine can be performed with test conditions and user conditions for using the test tools being inputted to the test tools.

In use of the method for downloading and managing a test tool of a test system of the invention, the test tool is downloaded through the network for using in the tested machine instead of being installed and loaded on the tested machine by a user in person. As such, there is required no disk or CD of the test tools as previously described, particularly for the tested machines being located in different areas or countries, it is advantageous to utilize the network for obtaining the test tools from the test service server. If the tested machine is subjected to any adjustment or alteration in the test, the newly-edited or upgraded test tool is provided from the test service server through the network. Moreover, in accordance with the increase in types of the tested machines and the change of the test environment, various test tools are available in the test service server, so as to perform the test for the tested machine with the optimal test tool.

BRIEF DESCRIPTION OF DRAWINGS

The above and other objectives, features, and advantages of the present invention will become apparent from the following description when taken in conjunction with accompanying drawings which illustrate preferred embodiments of the present invention by means of examples. The contents of the accompanying drawings are described as follows.

DETAILED DESCRIPTION OF PREFERRED EMBODIMENTS

Figure 1:
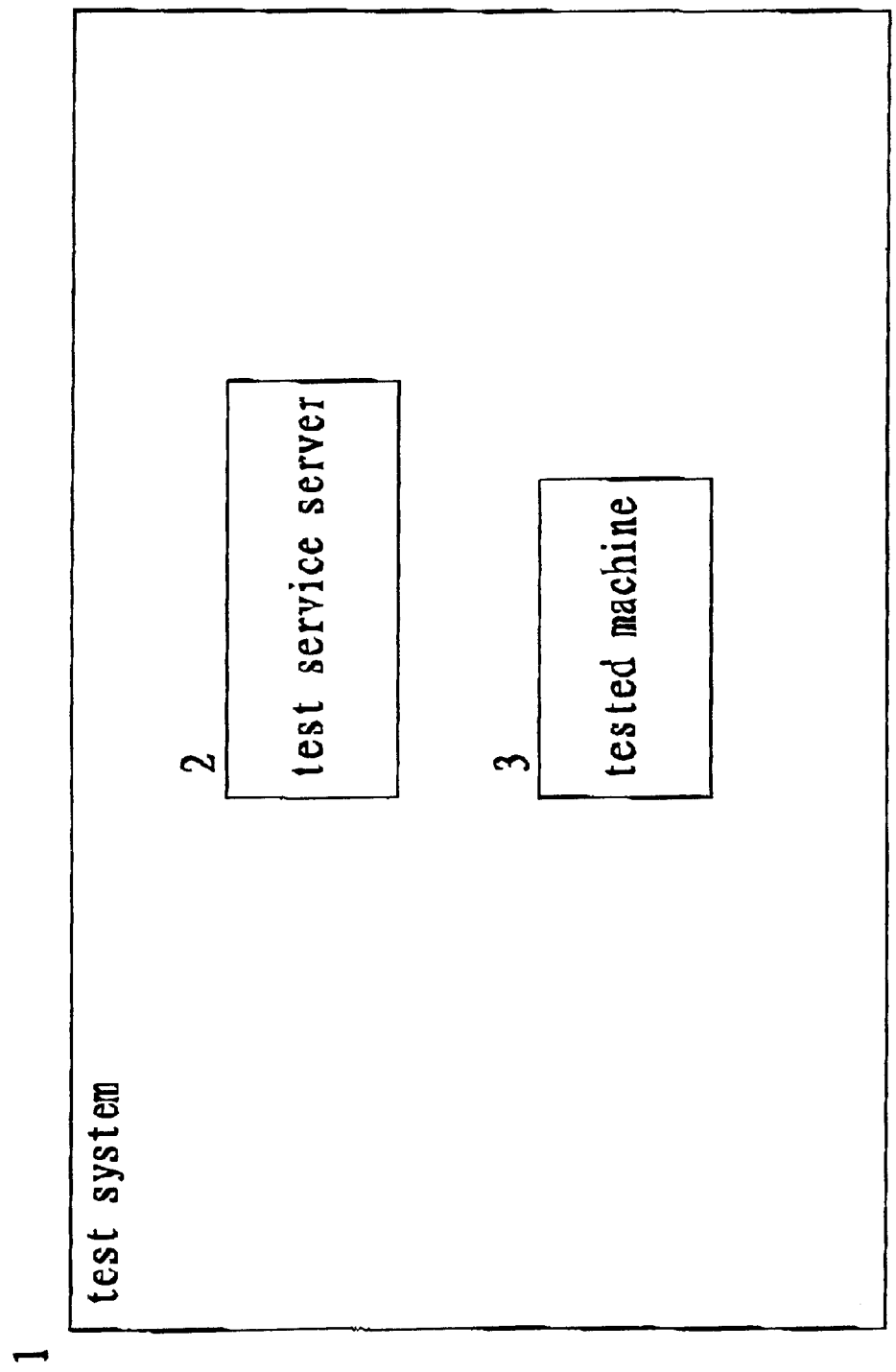
FIG. 1 is a block diagram illustrating the basic architecture of a test system used in a method for downloading and managing a test tool of the present invention.

FIG. 1 a block diagram illustrating the basic architecture of a test system used in a method for downloading and managing a test tool of the present invention. As shown in the drawing, the test system 1 consists of a test service server 2 and a tested machine 3. The test service server 2 is connected with the tested machine 3 through a network, allowing a test tool in the test service server 2 to be downloaded, installed and loaded through the network to the tested machine 3. The tested machine 3 and the test service server 2 can be located in different local area networks (LAN), wherein data transmission therebetween is accomplished by using Internet and a browser of the tested machine 3, and the data obtained is displayed in the browser of the tested machine 3. The test tool downloaded from the test service server 2 through the network to the tested machine 3 is then used to examine if the tested machine 3 works properly.

The test service server 2 executes a management process for the test tool, which is used to depict instructions of the test tool, process of a test, layout of tools and maintenance of versions. Moreover, the test service server 2 provides the test tools through the network for performing the test for the tested machine 3.

The tested machine 3 activates a start-up process for the test, wherein the start-up process is used to start the tested machine 3, and to connect the tested machine 3 and the test service server 2 through the network, allowing the test tool to be downloaded from the test service server 2 through the network. Then, the test for the tested machine 3 can be performed with a test condition and a user condition for using the test tools being inputted to the test tool.

As a result, instead of installing and loading the test tool to each tested machine 3 in person, the user can download the test tool from the test service server 2 to the tested machine 3 through the network. Moreover, instead of preparing plenty of disks or CDs of the test tools, the user provides the test tools for the tested machines 3 at different areas or countries in such a manner that the test tools are downloaded and available through the network from the test service server 2. In accordance with adjustment or alteration required in the test for the tested machine 3, the newly-edited or upgraded test tools are obtained from the test service server 2 through the network. In addition, with the increase in types of the tested machines 3 and change of the test environment, various versions of the test tools are available from the test service server 2 so as to perform the test for the tested machine 3 with the most preferable test tool.

Figure 2:
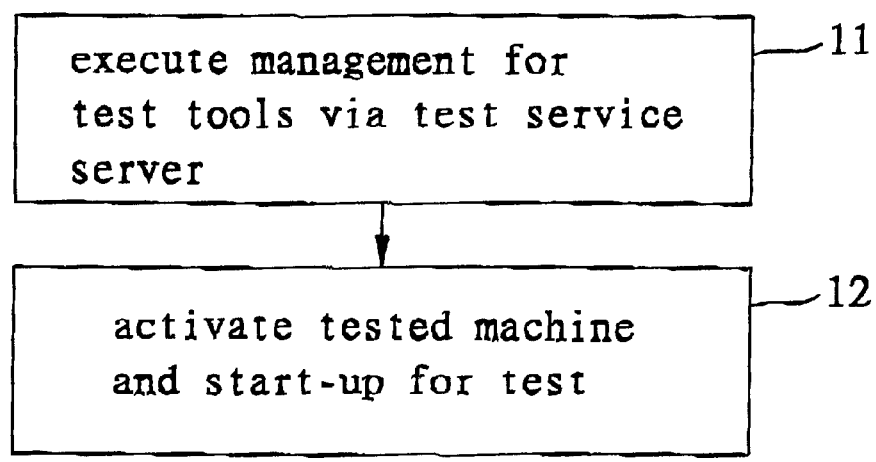
FIG. 2 is a flow chart illustrating the steps involved in downloading and managing a test tool by using a method for downloading and managing a test tool of a test system of the present invention.

FIG. 2 is a flow chart illustrating the steps involved in downloading and managing a test tool by using a method for downloading and managing a test tool of a test system of the present invention. As shown in the drawing, first in step 11, the test service server 2 executes a management process for the test tool, which is used to depict instructions of the test tool, process of a test, layout of tools and maintenance of versions. The test service server 2 is connected with the tested machine 3 through a network and provides the test tools through the network for performing the test for the tested machine 3.

In the management process, first, a common outlook bar is defined for creating a dynamic link library (DLL) document upon developing the test tool. The DLL document contains information for instructions of the test tool, process of the test, and layout of the tools. Upon loading the test tool, information for a route of the DLL document for the test tool is required to be written to a register database of the test service server 2, allowing a user to browse the DLL document for further understanding the test tool by inputting the route of the DLL document to be browsed to the register database. After completing the loading of the test tool, when the management process for the test tool is activated again, first, the register database is checked for a message of the test tool. If the message of the test tool is found, the user can browse the DLL document of the test tool for obtaining the test process and the tool layout depicted in the DLL document. If the test tool is renamed or upgraded, the register database has the test tool written therein with a different name and symbol shown on an interface of the management process. As such, the user is allowed to browse or arrange different test tools in cooperation with the DLL documents thereof for maintaining and upgrading versions of the test tools.

In step 12, the tested machine 3 activates a start-up process for the test, wherein a start-up window for the process is created according to a suitable network card, the test tool, a user's account and password selected by the user, and further the start-up window contains information for documents of system activation, driving procedure of the network card, the test tool and the user's account. As such, by means of the start-up window, the tested machine 3 is activated and connected with the test service server 2 through a network, allowing the test tool to be downloaded from the test service server 2 through the network. Then the test for the tested machine 3 can be performed by the user for inputting a test condition and a user condition for using the test tool to the test tool.

Figure 3:
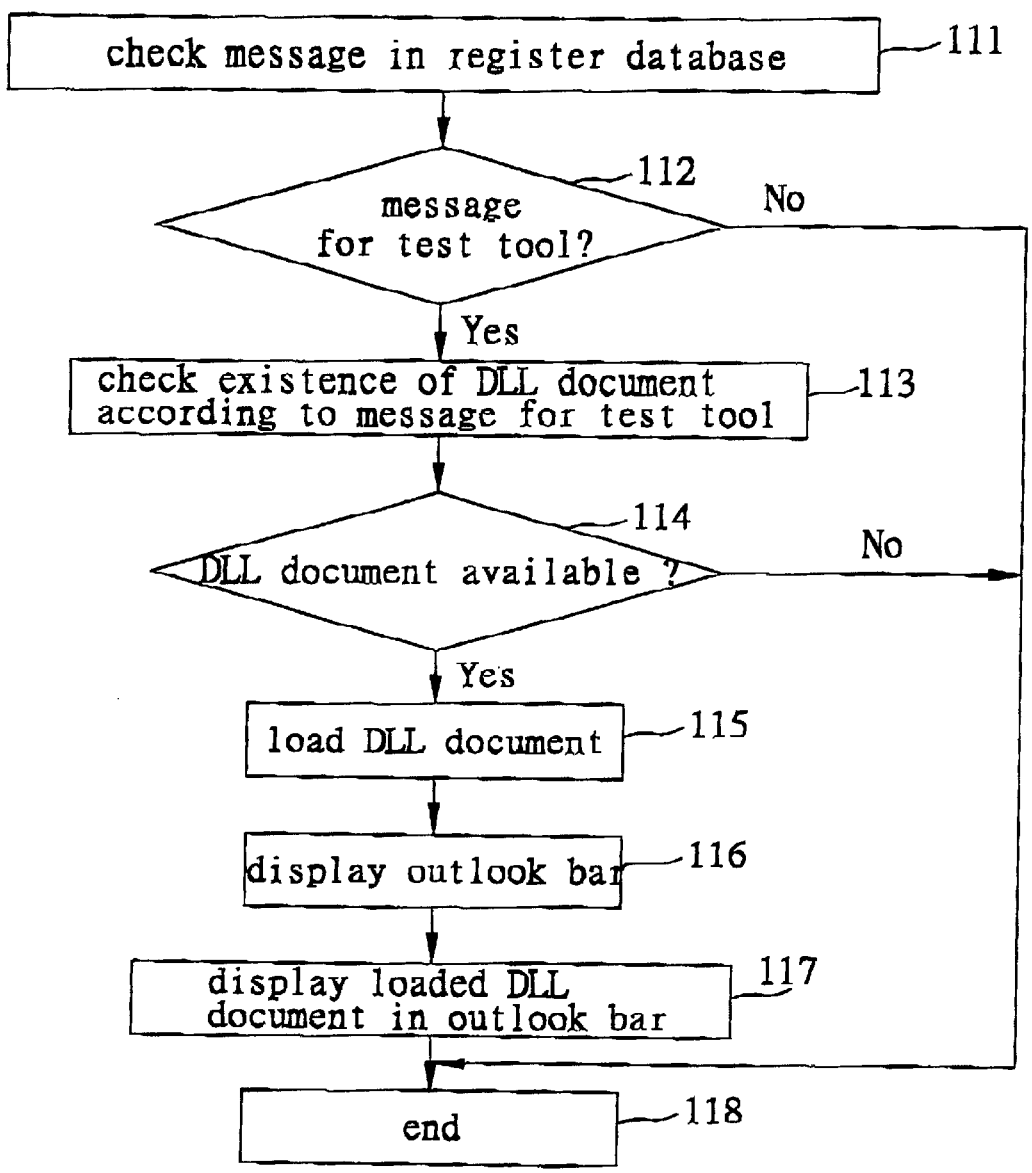
FIG. 3 is a flow diagram illustrating in detail the procedures involved in the step of executing a management process for a test tool by using a test service server in FIG. 2.

FIG. 3 is a flow diagram illustrating in detail the procedures involved in the step of executing a management process for a test tool by using a test service server in FIG. 2. As shown in the drawing, in step 111, after completing the loading of the test tool, the management process for the test tool is activated again, and the test service server 2 checks for a message of the test tool in the register database thereof. Then it moves on to step 112.

In step 112, it is to determine if the message of the test tool is available. The message includes instructions of the test tool, process of the test, layout of the tools and maintenance of the versions. If no message is available, it moves on to step 118. If the message is available, it moves on to step 113.

In step 113, it is to check if a DLL document of the test tool exists according to the message of the test tool. Then it moves on to step 114.

In step 114, it is to determine if the DLL document is available. If it is not available, it moves on to step 118. If the document is available, it moves on to step 115.

In step 115, the available DLL document is loaded. Then it moves on to step 116.

In step 116, the outlook bar is displayed, and it moves on to step 117.

In step 117, the loaded DLL document is displayed in the outlook bar.

In step 118, the step ends.

Figure 4:
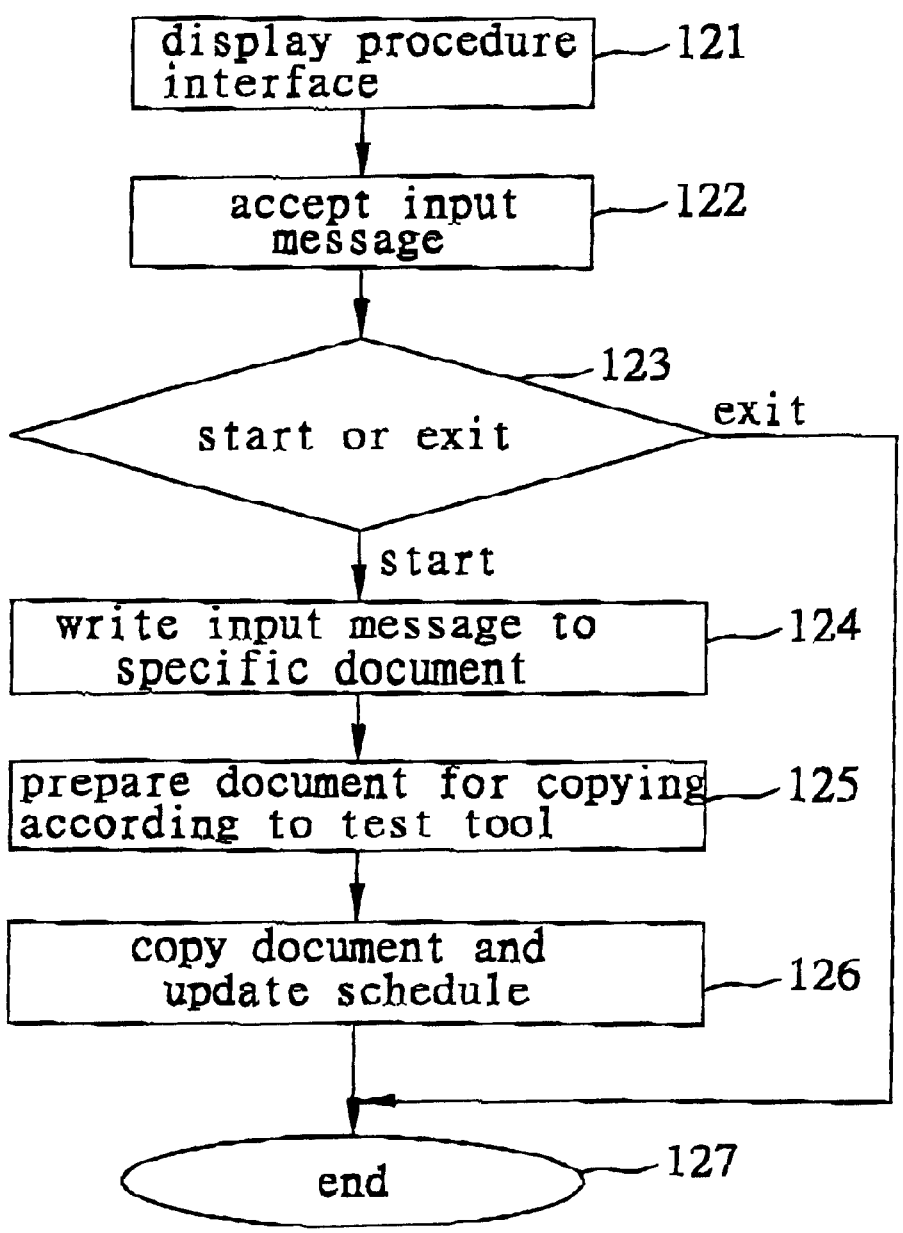
FIG. 4 is a flow diagram illustrating in detail the procedures involved in the step of activating a tested machine and start-up for a test in FIG. 2.

FIG. 4 is a flow diagram illustrating in detail the procedures involved in the step of activating a tested machine and start-up for a test in FIG. 2. As shown in the drawing, in step 121, a procedure interface is displayed on a browser of the tested machine 3. It then moves on to step 122.

In step 122, the procedure interface in the browser of the tested machine 3 is inputted with a message by the user. The message includes type of a network card, the test tool, a user's account and password for the creation of the start-up window. It then moves on to step 123.

In step 123, to create the start-up window or to exit is determined. If it is determined to exit, it moves on to step 127. If it is to create the start-up window, it moves on to step 124.

In step 124, the message inputted by the user is written to a specific document, and it moves on to step 125.

In step 125, the document for copying is prepared according to the test tool, and it moves on to step 126.

In step 126, the document of step 125 is copied and a schedule is updated. Then it moves on to step 127.

In step 127, the step ends.

As concluded from the above-mentioned, the present invention proposes a method for downloading and managing a test tool of a test system having a test service server and a tested machine connected with the test service server through a network. As such, a user can download the test tool from the test service server through the network for the tested machine, instead of installing and loading the test tool to the tested machine in person. Moreover, in application of the network, the tested machines at different areas or countries can be provided with the test tools downloaded from the test service server, without plenty of disks or CDs of the test tools being prepared. In addition, for any adjustment or alteration in a test performed for the tested machine, the newly-edited or upgraded test tools can be obtained from the test service server through the network. Similarly, with the increase in types of the tested machines and change of the test environment, different versions of the test tools are available from the test service server for performing the test for the tested machine with the most preferable test tool.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for downloading and managing a test tool of a test system having a test service server and a tested machine connected with the test service server through a network, the method comprising the steps of:

(a) activating a management process for the test tool in the test service server, and providing the test tool through the network via the test service server for performing a test for the tested machine, the management process activating step (a) further comprises the steps of: (a1) defining an outlook bar in the test service server for creating a dynamic link library (DLL) document upon developing the test tool; (a2) writing a route of the DLL document of the test tool to a register database of the test service server upon loading the test tool, for allowing the user to browse the DLL document for further understanding the test tool; (a3) reactivating the management process for the test tool for searching a message of the test tool upon completing the loading of the test tool in the register database, and for reloading the DLL document of the test tool if the message is found; and (b) activating start-up of the test for the tested machine, and downloading the test tool from the test service server through the network, for allowing a user to input a test condition and a user condition for using the test tool to the test tool for performing the test for the tested machine.

2. The method for downloading and managing a test tool of a test system of claim 1, wherein the management process for the test tool in the test service server is used to depict instructions of the test tool, process of the test, layout of tools and maintenance of versions.

3. The method for downloading and managing a test tool of a test system of claim 1, wherein the management process activating step (a) comprises the steps of:

(a4) reactivating the management process for the test tool upon completing the loading of the test tool, and searching a message of the test tool in the register database of the test service server;

(a5) determining if the message of the test tool is available; if the message is not available, it moves on to step (a8); if the message is available, it moves on to step (a3);

(a6) checking if a dynamic link library (DLL) document of the test tool exists;

(a7) determining if the DLL document is available; if the document is not available, it moves on to step (a8); if the document is available, it moves on to step (a5);

(a8) reloading the DLL document;

(a9) displaying an outlook bar, (a10) displaying the DLL document in the outlook bar; and (a11) ending the process.

4. The method for downloading and managing a test tool of a test system of claim 1, wherein the management process activating step (a) comprises the steps of:
- (a4) displaying a procedure interface in a browser of the tested machine;
- (a5) inputting a message by the user to the procedure interface of the browser for creating a start-up window; and
- (a6) determining if to create the start-up window or to exit, and taking corresponding actions.

5. The method for downloading and managing a test tool of a test system of claim 4, wherein the determining step (a6) comprises the steps of:
- (a6i) ending the step if to exit;

if to create the start-up window,
- (a6ii) writing the inputted message to a specific document;
- (a6iii) preparing the document for copying according to the test tool;
- (a6iv) copying the document and updating a schedule; and
- (a6v) ending the step.

6. The method for downloading and managing a test tool of a test system of claim 1, wherein the management process activating step (a) comprises the steps of:
- (a4) displaying a procedure interface in a browser of the tested machine;
- (a5) inputting a message by the user to the procedure interface of the browser for creating a start-up window;
- (a6) determining if to create the start-up window or to exit, if to exit, it moves on to step (a7); if to create the start-up window, it moves on to step (a4);
- (a7) writing the inputted message to a specific document;
- (a8) preparing the document for copying according to the test tool;
- (a9) copying the document and updating a schedule; and
- (a10) ending the process.

7. A method for downloading and managing a test tool of a test system having a test service server and a tested machine connected with the test service server through a network, the method comprising the steps of:
- (a) activating a management process for the test tool in the test service server, and providing the test tool through the network via the test service server for performing a test for the tested machine, wherein the management process activating step (a) further comprises the steps of:
  - (a1) reactivating the management process for the test tool upon completing the loading of the test tool for searching a message of the test tool in the register database;
  - (a2) determining if the message of the test tool is available, and taking corresponding actions; and
- (b) activating start-up of the test for the tested machine, and downloading the test tool from the test service server through the network, for allowing a user to input a test condition and a user condition for using the test tool for performing the test for the tested machine.

8. The method for downloading and managing a test tool of a test system of claim 7, wherein the determining step (a2) comprises the steps of:
- (a2i) ending the procedure if the message is not available;
- (a2ii) checking if a dynamic link library (DLL) document of the test tool exists if the message is available; and
- (a2iii) determining if the DLL document is available, and taking corresponding actions.

9. The method for downloading and managing a test tool of a test system of claim 8, wherein the DLL document checking step (a2ii) comprises the steps of:
- (a2ii ) ending the procedure if the DLL document is not available;

if the DLL document is available,
- (a2ii2) reloading the DLL document;
- (a2ii3) displaying ai outlook bar;
- (a2ii4) displaying the DLL document in the outlook bar; and
- (a2ii5) ending the procedure.

* * * * *